United States Patent [19]
Pease

[11] Patent Number: 5,524,813
[45] Date of Patent: Jun. 11, 1996

[54] SEAM WELDING APPARATUS AND METHOD

[75] Inventor: Michael L. Pease, Richmond, Ind.

[73] Assignee: Holiday Rambler, L.L.C., Wakarusa, Ind.

[21] Appl. No.: 390,989

[22] Filed: Feb. 21, 1995

[51] Int. Cl.$^6$ ................................................ B23K 37/04
[52] U.S. Cl. .................... 228/212; 228/44.3; 228/6.1; 219/60 R; 219/61
[58] Field of Search ............................ 228/212, 6.1, 44.3; 219/60 R, 61

[56] References Cited

U.S. PATENT DOCUMENTS

| | | | |
|---|---|---|---|
| 3,527,918 | 9/1970 | Fielder et al. | 219/124.31 |
| 3,639,974 | 2/1972 | Finnegan | 228/44.3 |
| 4,205,774 | 6/1980 | Madden et al. | 228/32 |

FOREIGN PATENT DOCUMENTS

| | | | |
|---|---|---|---|
| 641412 | 12/1963 | Belgium | 219/125.1 |
| 1095095 | 4/1960 | France | 228/212 |
| 52-36743 | 9/1977 | Japan . | |

*Primary Examiner*—P. Austin Bradley
*Assistant Examiner*—Jeffrey T. Knapp
*Attorney, Agent, or Firm*—Leydig, Voit & Mayer, Ltd.

[57] ABSTRACT

A welding apparatus and method is provided for automatically welding a stack of two or more metal tubes together. The tubes are stacked such that there is a pair of opposed longitudinal interfaces (or seams) between each tube in the stack. The welding apparatus broadly comprises: a stationary welding means for forming welds along the seams between each tube; a drive means for linearly advancing the stack of tubes relative to the welding means and for preventing separation of the tubes as the welds are being formed; and an alignment means for continuously and accurately keeping the stack of tubes in proper alignment as the drive means advances the tubes. The welding method broadly comprises: aligning the tubes in accurate stacked relation; holding the tubes together in stacked relation; advancing the tubes relative to a stationary welding means while maintaining the tubes in stacked relation; and welding the opposed longitudinal interfaces between each tube as the tubes are moved relative to the welding means.

23 Claims, 4 Drawing Sheets

SEAM WELDING APPARATUS AND METHOD

BACKGROUND OF THE INVENTION

1. Field of the Invention

The present invention relates generally to welding and, more particularly, concerns a welding apparatus and method for automatically welding a stack of metal tubes together. This type of welding is an essential operation in various applications, including the construction of heavy-duty frames for towable vehicles.

2. Description of the Prior Art

There are various known ways to weld a stack of tubes together. One representative approach is a manual operation involving an initial tack welding operation followed by a permanent metal-inert-gas (MIG) welding operation.

Generally, this approach has two distinct steps. First, an initial series of tack welds are made at various locations along the longitudinal interface (or seam) between each tube in the stack. The purpose of this initial tack welding operation is to provide a bond between the tubes of sufficient strength to keep the tubes in place during the ensuing MIG welding operation. In order to prevent misalignment amongst the tubes as the welds are being made, clamps must be used to bind the tubes in place. Two clamping techniques are known in the art. Either the stack can be completely immobilized by a myriad of clamps placed at various locations along the full length of the stack; or the tubes can be locally secured by two or three clamps. In the former technique, all of the tack weld can be made in a single pass without moving any of the clamps; and, in the latter technique, the clamps must be continuously relocated along the length of the stack throughout the tack welding operation. Both clamping techniques, however, are time consuming and labor intensive.

Second, after the tack welds have been completed, intermittent MIG welds are made along each seam in the stack. In particular, all the seams along one side of the stack are welded during the first pass, after which the stack is turned over, and all of the seams on the reverse side are welded during the second pass. During the first pass, however, the heat imposed by the welds tends to warp the stack. To help alleviate this problem, it is generally preferable to make the welds on the reverse side longer than those on the first side. Frequently, though, the warping caused by the first pass cannot be fully corrected and the stack remains slightly crooked.

Thus, aside from being very labor intensive and time consuming, this manual approach also tends to be rather non-repetitive. Although other approaches have eliminated some of the problems associated with the above-described operation, none have completely automated the procedure nor has any single approach satisfactorily corrected all of the deficiencies.

OBJECTS AND SUMMARY OF THE INVENTION

The primary object of the present invention is to provide an apparatus which automatically welds a stack of metal tubes together.

A more detailed object of the present invention is to provide a welding apparatus which automatically forms welds along the opposed longitudinal interfaces (or seams) between each tube in the stack.

Another object of the present invention is to provide a welding apparatus which is capable of welding both sides of the stack at the same time (and in one pass).

A related object of the present invention is to provide a welding apparatus which minimizes the amount of warpage caused by the welding operation.

A further object of the present invention is to provide an apparatus of the foregoing type which is reliable and convenient to use.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
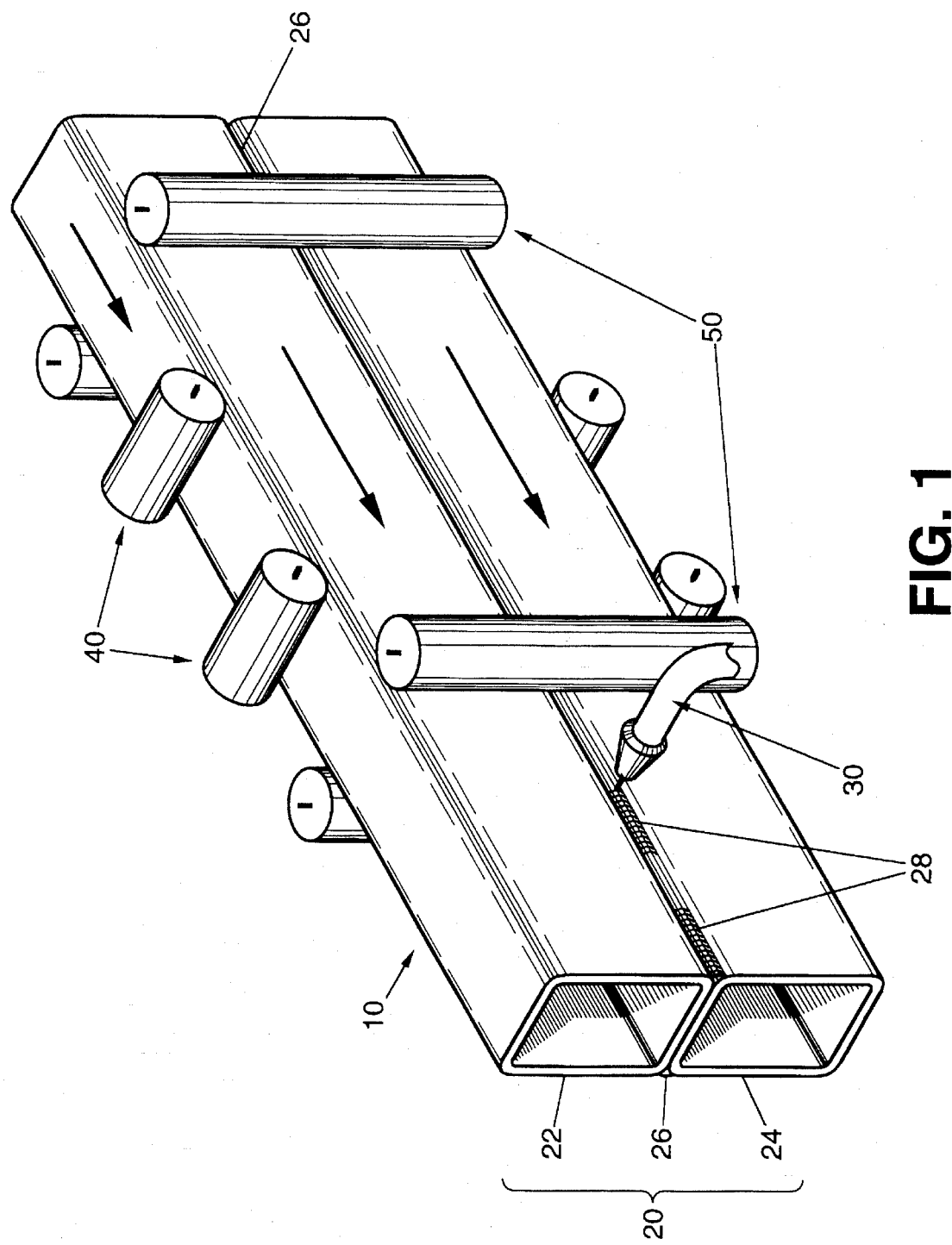
FIG. 1 is a perspective view of a welding apparatus in accordance with the present invention as a stack of metal tubes are being welded together.

Turning now to the drawings, FIG. 1 shows a perspective view of a welding apparatus 10 in accordance with the present invention as a stack of metal tubes 20 are being welded together. In the illustrated embodiment, the stack 20 comprises two individual tubes—top tube 22 and a bottom tube 24—that are generally rectangular in cross-section. Also, a single longitudinal interface (or seam) 26, defined by where the top and bottom tubes 22, 24 intersect, is situated on both sides of the stack 20. In accordance with the present invention, either a single, continuous weld or a series of short, intermittent welds 28 are positioned along each seam 26. The welds 28 fuse the tubes together and may be formed by any type of welding that sufficiently bonds the tubes together, but, preferably, are formed by metal-inert-gas (MIG) welding. Although the illustrated embodiment depicts a stack of two individual tubes 22, 24 that are generally rectangular in cross-section, it will be appreciated that the stack 20 may contain more than two tubes and the cross-sectional shape of the tubes may be other than rectangular, as long as a pair of opposed longitudinal seams 26 exists between each tube.

The welding apparatus 10 of the present invention broadly comprises a welding means 30, a drive means 40, and an alignment means 50. In operation, the drive means 40 linearly advances the stack of tubes 20 past the stationary welding means 30 while the alignment means 50 continuously and accurately keeps the stack of tubes 20 in proper alignment. As the stack of tubes 20 is driven in the direction indicated by the arrow in FIG. 1, the stationary welding means 30 forms welds 28 along the seams 26 between each tube 22, 24.

Figure 2:
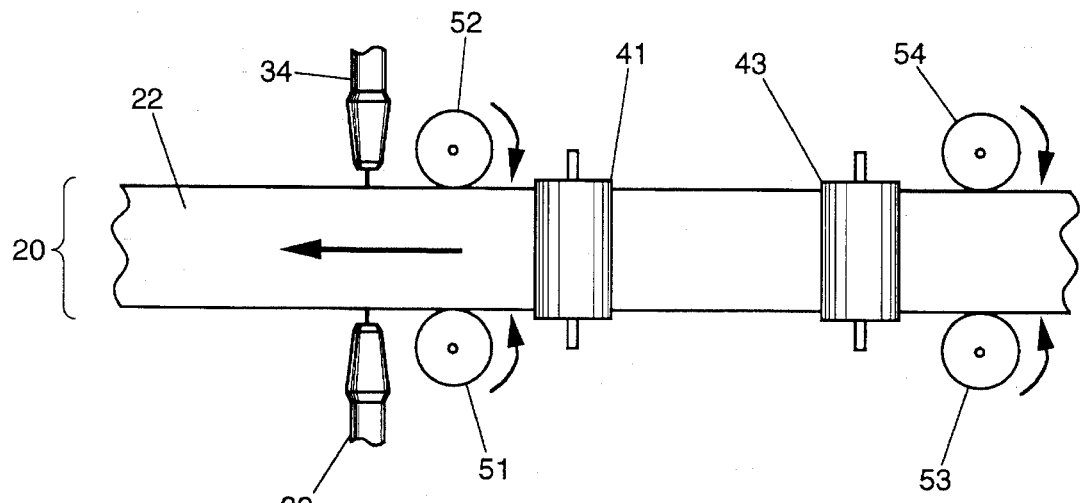
FIG. 2 is a top view of the welding apparatus as the stack of tubes are being welded together.
Figure 3:
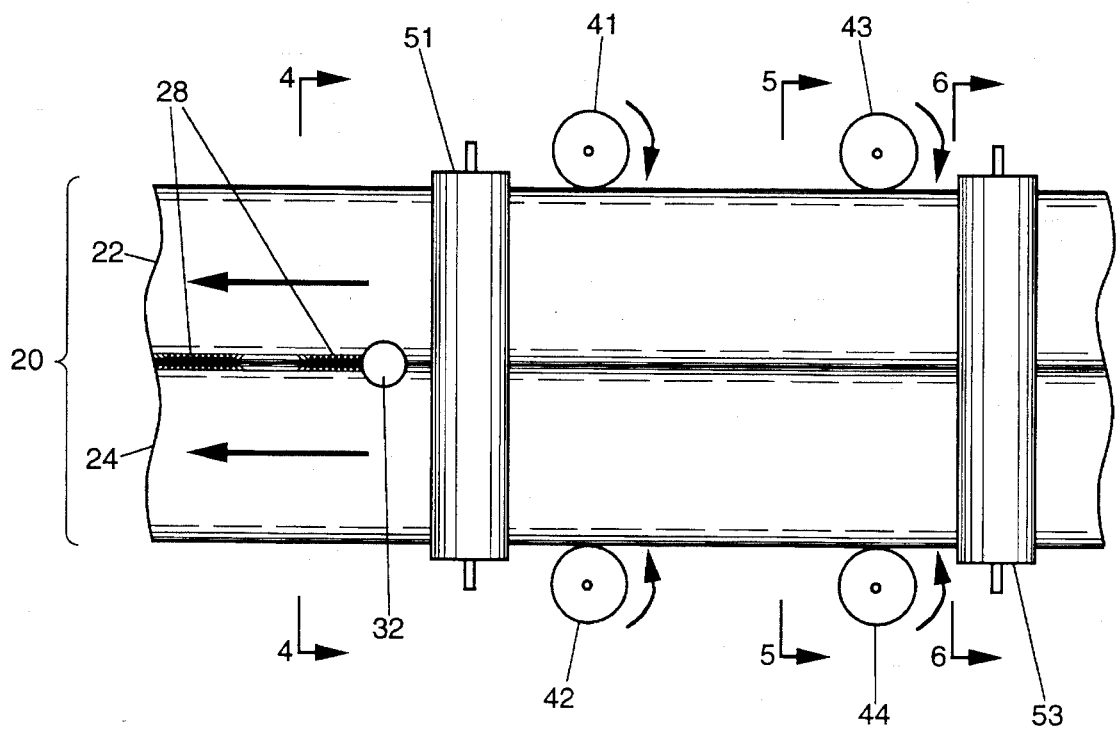
FIG. 3 is a side view of the welding apparatus as the stack of tubes are being welded together.
Figure 4:
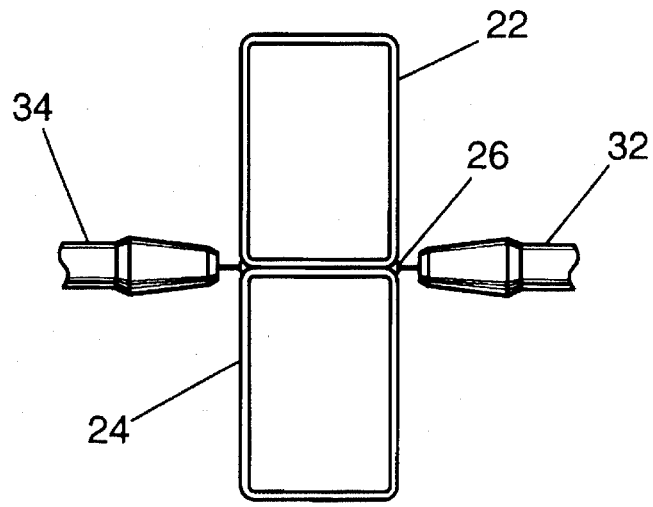
FIG. 4 is a cross-sectional view taken along line 4—4 in FIG. 3 showing the stack of tubes and a welding means.

The welding means 30 is provided for forming welds 28 along the seams 26 between the top and bottom tubes 22, 24. As best depicted in FIGS. 2 and 4, the welding means 30 comprises a pair of opposed welding units 32, 34 directed at the two seams 26. In operation, as the tubes 22, 24 are driven past the stationary welding units 32, 34, a pair of opposed welds 28 are formed along the seams 26. The welding units 32, 34 can either form a continuous weld 28 along the entire length of both seams 26 or an intermittent (skip) weld 28 as shown in FIGS. 1 and 3. In either case, the opposed welds are preferably formed at the same time.

Figure 5:
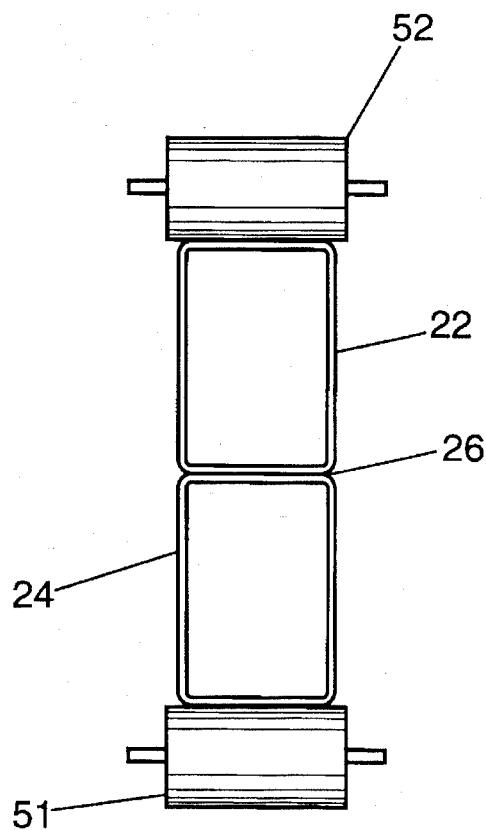
FIG. 5 is a cross-sectional view taken along line 5—5 in FIG. 3 showing the stack of tubes and a drive means.

The drive means 40 is provided for linearly advancing the stack of tubes 20 relative to the stationary welding means 30 and for preventing separation of the tubes 22, 24 as the welds 28 are being formed. In the illustrated embodiment, best shown in FIGS. 1, 3, and 5, the drive means 40 comprises two pair of substantially horizontal spaced-apart drive cylinders, including a forward pair 41, 42 and an aft pair 43, 44. The drive cylinders 41–44 are disposed to engage the top and bottom tubes 22, 24 and to linearly advance the entire stack 20 as the drive cylinders 41–44 are rotated, as illustrated in FIG. 3. It will be understood that each pair of drive cylinders 41, 42 and 43, 44 exerts an opposed vertical compressive force onto the stack 20. In accordance with the present invention, this compressive force should be sufficient to not only provide sufficient rolling friction between the drive cylinders 41–44 and the stack 20 but also to keep the tubes 22, 24 firmly pressed together as the welds 28 are being formed. Although the illustrated embodiment depicts two pair of opposed drive cylinders 41–44, it will be appreciated that the drive means 40 may consist of a single pair of opposed cylinders, a plurality of drive cylinders, or any other means which linearly advances the stack of tubes 20 and prevents tubes 22, 24 from separating during the welding operation.

Figure 6:
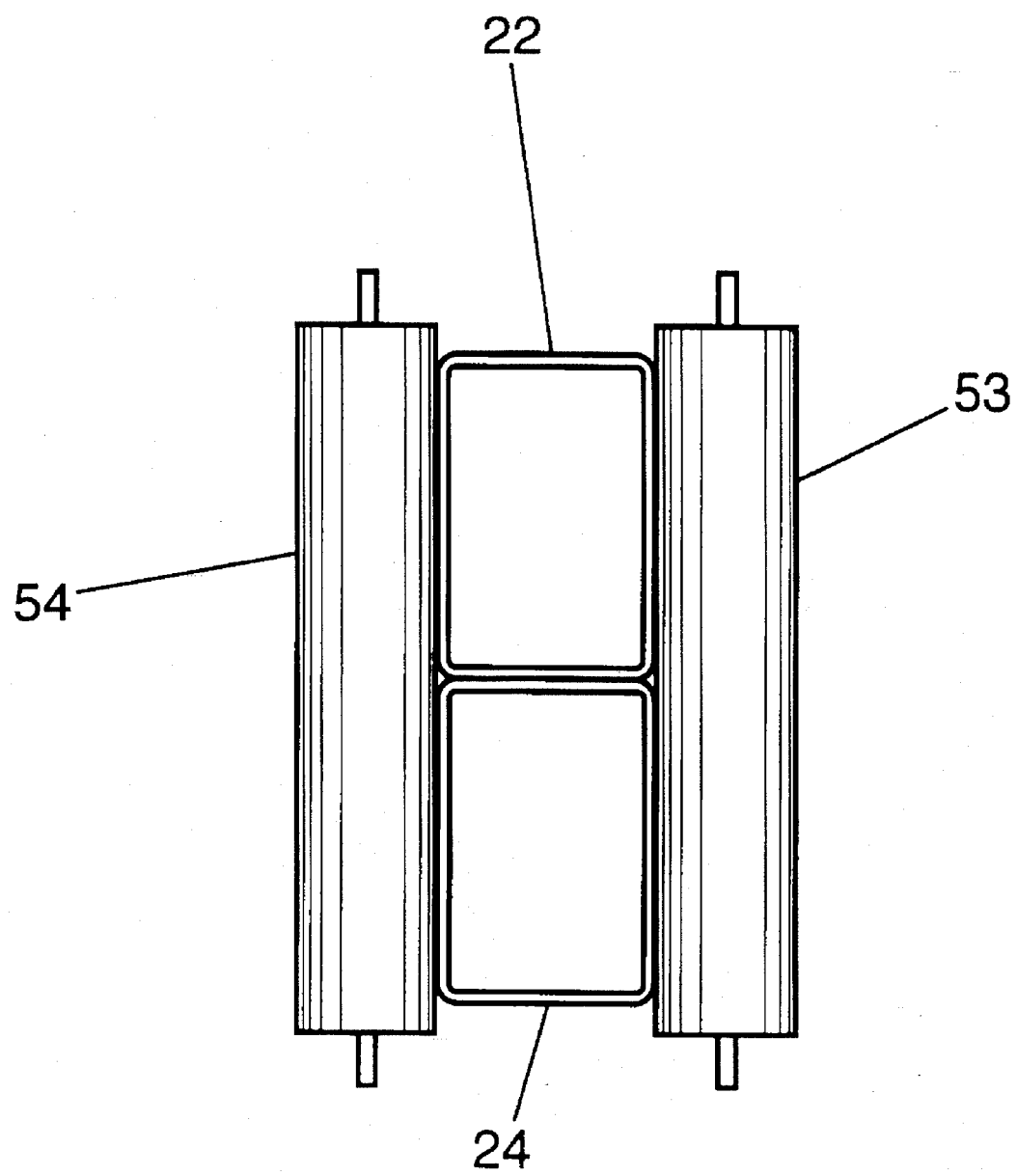
FIG. 6 is a cross-sectional view taken along line 6—6 in FIG. 3 showing the stack of tubes and an alignment means.

The alignment means 50 is provided for continuously and accurately keeping the stack of tubes 20 in proper alignment during the welding operation. In the illustrated embodiment, the alignment means 50 comprises two pair of substantially vertical spaced-apart side rollers, including a forward pair 51, 52 and an aft pair 53, 54. As shown in FIGS. 1, 3, and 6, the side rollers 51–54 are disposed to engage the opposing sides of the stack 20 where the seams 26 are located. In accordance with the present invention, each of the side rollers 51–54 exerts sufficient horizontal forces upon the stack 20 so as to keep the tubes 22, 24 in proper alignment throughout the welding operation. Although the illustrated embodiment portrays two pair of opposed side rollers 51–54, it will be appreciated that the alignment means 50 may consist of any number of side rollers, or any other means, which accurately keeps the stack of tubes 20 in alignment during the welding operation.

As an added feature of the present invention, a conveyor means (not shown) may be included for facilitating the admission of the tubes 22, 24 into the welding apparatus 10 prior to being welded and/or for facilitating the departure of the tubes 22, 24 off of the welding apparatus after being welded. One such conveyor means comprises a plurality of parallel and substantially horizontal rollers. Ideally, both conveyor means are of adequate length to accommodate the full length of the stack 20 to be welded.

In keeping with another important aspect of the present invention, an operation means (not shown) may also be provided for independently actuating and deactuating the drive and welding means 40, 30 and for controlling the length and/or duration of the welds 28. In particular, an on-off switch is used to start and stop the drive means 40 and a timer switch is used to control the welding means 30. If skip welds are desired, the timer switch controls the amount of time that the welding units 32, 34 are on and off, respectively.

For illustrative purposes only, experience has demonstrated that if the stack of tubes 20 is driven past the welding units 32, 34 at a constant rate of twenty four inches per minute, a nine second repetitive timing cycle (i.e. nine seconds on and nine seconds off) provides a high quality, consistent weld 28. To begin such a welding process, the forward end of the stack 20 is aligned with the welding units 32, 34 and the timer switch is activated. Once activated, there is a nine second delay before the welding begins. After about eight seconds (or as close as possible to the end of the first nine seconds), the on-off switch is activated which starts the drive means 40 and the stack 20 begins to move through the apparatus 10. Accordingly, when the first welding cycle begins, the stack 20 has just started to move which ensures that the forward end of the stack 20 will receive a full length skip weld 28. This timing cycle—nine seconds on and nine seconds off—is repeated along the entire length of the stack 20, providing a consistent and uniform skip weld 28 along both seams 26. Although a nine second repeating timing cycle has been discussed here, it will be appreciated that other timing cycles may also be used.

The present invention represents a substantial improvement over the prior art, in general, and over manual operations, in particular. First, stack warpage is minimized. Warpage is reduced not only by the drive cylinders 41–44 and side rollers 51–54, but by consolidating all welding operations into a single, uniform pass in which both (or all) seams 26 are welded at the same time. Second, the welding process is automated. Automation not only substantially reduces the amount of time that is required to weld each stack 20 (e.g. eliminating the laborious tack welding operation), but also significantly increases the consistency, repeatability, and overall quality of the welds 28.

I claim as my invention:

1. A welding apparatus for automatically welding a plurality of metal tubes together, the tubes being arranged in stacked relation such that there is a pair of opposed longitudinal interfaces between each tube, the welding apparatus comprising:

a stationary welding means for forming welds along the opposed longitudinal interfaces between each tube;

a drive means for linearly advancing the stack of tubes relative to the stationary welding means and for preventing separation of the tubes as the welds are being formed; and an alignment means for continuously and accurately keeping the stack of tubes in proper alignment as the drive means linearly advances the tubes.

2. A welding apparatus as defined in claim 1 wherein the tubes have a generally rectangular cross-section.

3. A welding apparatus as defined in claim 1 wherein the tubes have a generally square cross-section.

4. A welding apparatus as defined in claim 1 wherein the welding means comprises opposed metal-inert-gas welding units directed at each of the opposed longitudinal interfaces between each tube.

5. A welding apparatus as defined in claim 1 wherein the drive means comprises a plurality of substantially horizontal spaced-apart drive cylinders.

6. A welding apparatus as defined in claim 5 wherein the drive cylinders are disposed to engage the two outermost tubes of the stack and to linearly advance the entire stack of tubes as the drive cylinders are rotated.

7. A welding apparatus as defined in claim 6 wherein the drive cylinders exert an opposed vertical compressive force on the stack of tubes so as to keep the tubes firmly pressed together as the welds are formed.

8. A welding apparatus as defined in claim 7 wherein the drive cylinders are comprised of a single pair of opposed cylinders.

9. A welding apparatus as defined in claim 7 wherein the drive cylinders are comprised of more than a single pair of opposed drive cylinders.

10. A welding apparatus as defined in claim 1 wherein the alignment means comprises a plurality of substantially vertical spaced-apart side rollers.

11. A welding apparatus as defined in claim 10 wherein the side rollers are disposed to engage the opposing sides of all tubes and to continuously maintain the alignment of the stack as the drive means linearly advances the tubes.

12. A welding apparatus as defined in claim 11 wherein the side rollers are comprised of more than a single pair of opposed rollers.

13. A welding apparatus as defined in claim 1 comprising an entrance conveyor means for facilitating admission of the tubes into the welding apparatus prior to being welded.

14. A welding apparatus as defined in claim 13 wherein the entrance conveyor means comprises a plurality of parallel and substantially horizontal rollers.

15. A welding apparatus as defined in claim 1 comprising an exit conveyor means for facilitating departure of the tubes off of the welding apparatus after being welded.

16. A welding apparatus as defined in claim 15 wherein the exit conveyor means comprises a plurality of parallel and substantially horizontal rollers.

17. A welding apparatus as defined in claim 1 comprising an operation means for actuating and deactuating the welding apparatus and for controlling the duration of the welds.

18. A welding apparatus as defined in claim 17 wherein the operation means comprises an on-off switch for actuating and deactuating the drive means and a timer switch for actuating and deactuating the welding means.

19. A method of welding a plurality of tubes together, the tubes being arranged in stacked relation and having a pair of opposed longitudinal interfaces between each tube, the welding method comprising:

aligning the tubes in accurate stacked relation;

holding the tubes together in stacked relation;

advancing the tubes relative to a stationary welding means while maintaining the tubes in stacked relation; and welding the opposed longitudinal interfaces between each tube as the tubes are moved relative to the welding means.

20. A method of welding a stack of tubes together as defined in claim 19 comprising advancing the stack of tubes relative to the stationary welding means at a substantially fixed rate of speed.

21. A method of welding a stack of tubes together as defined in claim 19 comprising welding the opposed longitudinal interfaces at the same time and for the same duration.

22. A method of welding a stack of tubes together as defined in claim 21 comprising welding the opposed longitudinal interfaces intermittently so as to provide a repetitive pattern of welded and non-welded sections along the entire length of the interface.

23. A method of welding a stack of tubes together as defined in claim 22 comprising initiating a first welded section at either end of the stack.

* * * * *